(12) United States Patent
Yamamoto et al.

(10) Patent No.: US 8,152,973 B2
(45) Date of Patent: Apr. 10, 2012

(54) CLEANING DEVICE FOR HEAT EXCHANGER

(75) Inventors: Tetsuya Yamamoto, Gunma (JP); Tsuyoshi Rakuma, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1127 days.

(21) Appl. No.: 12/007,414

(22) Filed: Jan. 10, 2008

(65) Prior Publication Data

US 2008/0149475 A1   Jun. 26, 2008

(51) Int. Cl.
  *C25B 15/02*   (2006.01)
  *A61L 2/03*    (2006.01)
(52) U.S. Cl. .................... 204/230.2; 205/742
(58) Field of Classification Search .............. None
  See application file for complete search history.

(56) References Cited

U.S. PATENT DOCUMENTS 5,055,170 A * 10/1991 Saito .................... 204/228.6
5,474,662 A * 12/1995 Miyamae .................. 204/257

FOREIGN PATENT DOCUMENTS

| EP | 1625822 A1 * | 2/2006 |
| JP | 03-236488 | 10/1991 |
| JP | 5-39932 | 2/1993 |
| JP | 06-300486 | 10/1994 |
| JP | 08-327085 | 12/1996 |
| JP | 2000-334240 | 12/2000 |
| JP | 2004-114916 | 4/2004 |
| JP | 2007-101023 | 4/2007 |
| WO | WO 2005/037585 | 4/2005 |

OTHER PUBLICATIONS

Japanese Office Action issued in Japanese Patent Application No. 2006-238818, mailed Mar. 15, 2011.
European Search Report issued in Patent Application No. EP 07024848.9-2301 dated on Apr. 16, 2008.

* cited by examiner

*Primary Examiner* — Harry D Wilkins, III
(74) *Attorney, Agent, or Firm* — McDermott Will & Emery LLP

(57) ABSTRACT

There is disclosed a cleaning device for a heat exchanger which safely and effectively cleans the heat exchanger and which can sufficiently obtain a deodorizing effect and a sterilization effect. The cleaning device for the heat exchanger includes an electrolysis unit for treating dew condensation water of the heat exchanger by an electrochemical technique, a supply unit for supplying electrolytic water produced by the treatment performed by this electrolysis unit to an outer surface of the heat exchanger, and an control unit for controlling the electrolysis unit and the supply unit, and the control unit allows the electrolysis unit to electrolytically treat the dew condensation water of the heat exchanger and produce the electrolytic water, and allows the supply unit to supply the produced electrolytic water to the outer surface of the heat exchanger.

11 Claims, 5 Drawing Sheets

RELATION BETWEEN CONCENTRATION OF OZONE WATER PRODUCED BY ELECTROLYSIS AND WATER TEMPERATURE

CLEANING DEVICE FOR HEAT EXCHANGER

BACKGROUND OF THE INVENTION

The present invention relates to a cleaning device for a heat exchanger which removes mold, germs and the like attached to an outer surface of the heat exchanger.

Heretofore, in a heat exchanger, for example, a heat exchanger which functions as an evaporator constituting a refrigerant cycle of an air conditioner, a refrigerant in the heat exchanger absorbs heat from surrounding air and consequently it evaporates, whereby a cooling function is exerted to cool a space to be cooled. In this case, when the refrigerant absorbs the heat from the surrounding air, water in the air condenses (dew-condenses) and attaches to the surface (the outer surface) of the heat exchanger in the form of water droplets. During operation, the water which attaches to the outer surface of the evaporator gradually grows and then drops down owing to a gravity, whereby the water is discharged therefrom. After the operation is stopped, however, the water remains on the outer surface of the heat exchanger. The water includes dust and microorganisms such as bacteria in the air, and when they remain on the outer surface of the heat exchanger, they are deposited as the mold and dust on the outer surface of the heat exchanger.

In a case where the operation is performed in a state in which the mold and dust are deposited on the outer surface of the heat exchanger in this manner, the mold and dust deposited on the heat exchanger disadvantageously emit odor into the space to be cooled, whereby the space to be cooled is contaminated. Therefore, the heat exchanger has heretofore been cleaned to remove the dust and microorganisms such as bacteria attached to the outer surface of the heat exchanger.

Specifically, an ozone producer which produces gas-phase ozone from the air is disposed. After a cooling operation ends, the gas-phase ozone produced by the ozone producer is formed into micro bubbles, and dissolved in the water to produce ozone water (ozone-containing water). Then, this ozone water is supplied to the outer surface of the heat exchanger to destroy the microorganisms with the ozone water (e.g., see Japanese Patent Application Laid-Open No. 5-39932).

However, in a case where the ozone is produced from the air by the ozone producer as described above, a problem occurs that nitrogen oxide (NOx) known as one of causative substances of atmospheric contamination is also produced in a process of the production of the ozone. Furthermore, the gas-phase ozone is produced from the air, and this ozone is dissolved to produce the ozone water, so that a concentration of the ozone water cannot sufficiently be raised.

SUMMARY OF THE INVENTION

The present invention has been developed to solve such a problem of the conventional technology, and an object thereof is to provide a cleaning device for a heat exchanger which safely and effectively cleans the heat exchanger without generating a hazardous substance such as NOx, so that a deodorizing effect and a sterilization effect can sufficiently be obtained.

A cleaning device for a heat exchanger according to a first invention is characterized by comprising: electrolysis means for treating dew condensation water of the heat exchanger by an electrochemical technique; supply means for supplying electrolytic water produced by the treatment performed by this electrolysis means to an outer surface of the heat exchanger; and control means for controlling the electrolysis means and the supply means.

The cleaning device for the heat exchanger according to a second invention is characterized in that in the above invention, the electrolysis means includes an anode and a cathode to be immersed into the dew condensation water, and an ion exchange film which divides the dew condensation water into an anode side and a cathode side, and the control means allows the supply means to switch the electrolytic water on the anode side and the electrolytic water on the cathode side and supply the electrolytic water to the outer surface of the heat exchanger.

The cleaning device for the heat exchanger according to a third invention is characterized in that in the second invention, the control means allows the supply means to supply the electrolytic water on the anode side to the outer surface of the heat exchanger and then supply the electrolytic water on the cathode side to the outer surface of the heat exchanger.

The cleaning device for the heat exchanger according to a fourth invention is characterized in that in any of the first to third inventions, the control means has a cleaning and germ removal mode in which the electrolytic water is supplied to the heat exchanger to clean the outer surface of the heat exchanger, and an air cleaning mode in which germs are removed from the air passed through the heat exchanger, and in the air cleaning mode, an amount of the electrolytic water to be supplied to the heat exchanger by the supply means is set to be smaller than that in the cleaning and germ removal mode.

The cleaning device for the heat exchanger according to a fifth invention is characterized in that in any of the first to fourth inventions, the electrolysis means is arranged on a leeward side of the heat exchanger.

The cleaning device for the heat exchanger according to a sixth invention is characterized in that in any of the first to fifth inventions, the control means controls the electrolysis means in accordance with a temperature of the dew condensation water.

According to the cleaning device for the heat exchanger in the first invention, the device includes the electrolysis means for treating the dew condensation water of the heat exchanger by the electrochemical technique, the supply means for supplying the electrolytic water produced by the treatment performed by this electrolysis means to the outer surface of the heat exchanger, and the control means for controlling the electrolysis means and the supply means. Therefore, active oxygen species such as ozone and hypohalogen acid are efficiently generated from the dew condensation water of the heat exchanger by the electrolysis means, and the electrolytic water including the generated active oxygen species is supplied to the outer surface of the heat exchanger by the supply means, whereby the outer surface of the heat exchanger can be cleaned.

Especially, the dew condensation water of the heat exchanger is treated by the electrolysis means, whereby the water for electrolysis does not have to be supplied separately, and hence cost can be reduced as much as possible. Furthermore, the dew condensation water is directly electrolytically treated, whereby a concentration of the generated active oxygen species can be raised.

According to the cleaning device for the heat exchanger in the second invention, in the above invention, the electrolysis means includes the anode and the cathode to be immersed into the dew condensation water, and the ion exchange film which divides the dew condensation water into the anode side and the cathode side, and the control means allows the supply means to switch the electrolytic water on the anode side and the electrolytic water on the cathode side and supply the electrolytic water to the outer surface of the heat exchanger. Therefore, the electrolytic water including active oxygen species such as the ozone and hypohalogen acid is produced on the anode side divided by the ion exchange film, and the alkaline electrolytic water is produced on the cathode side divided by the ion exchange film, so that when the supply means supplies the anode-side electrolytic water to the outer surface of the heat exchanger, mold, germs and the like on the outer surface of the heat exchanger can be removed. When the cathode-side electrolytic water is supplied to the outer surface of the heat exchanger, dirt such as oil can be removed.

For example, as in the third invention, the control means allows the supply means to supply the electrolytic water on the anode side to the outer surface of the heat exchanger and then supply the electrolytic water on the cathode side to the outer surface of the heat exchanger. In this case, the outer surface of the heat exchanger is cleaned with the anode-side electrolytic water, and then the germs can be removed from the outer surface of the heat exchanger with the cathode-side electrolytic water. Especially, the outer surface of the heat exchanger is cleaned with the anode-side electrolytic water, and then the cathode-side electrolytic water is supplied to the outer surface of the heat exchanger, whereby a germ removal effect with the cathode-side electrolytic water can further be improved.

Moreover, as in the fourth invention, the control means has the cleaning and germ removal mode in which the electrolytic water is supplied to the heat exchanger to clean the outer surface of the heat exchanger, and the air cleaning mode in which the germs are removed from the air passed through the heat exchanger. In this case, the device can not only clean the heat exchanger but also purify the air passed through the heat exchanger. Especially, in the air cleaning mode, the amount of the electrolytic water to be supplied to the heat exchanger by the supply means is set to be smaller than that in the cleaning and germ removal mode, whereby humidification of the air with the electrolytic water can be suppressed.

Furthermore, as in the fifth invention, the electrolysis means is arranged on the leeward side of the heat exchanger, whereby a temperature of the electrolysis means can be lowered by the heat exchanger. In consequence, an amount of the active oxygen species to be generated in the electrolysis means can be increased.

In addition, as in the sixth invention, the control means controls the electrolysis means in accordance with the temperature of the dew condensation water. In this case, the amount of the active oxygen species to be generated in the electrolysis means can be controlled into an optimum amount. For example, heating means such as a heater is installed in the vicinity of the electrolysis means, and the temperature of the dew condensation water is controlled, whereby a disadvantage that the temperature of the dew condensation water excessively lowers can be eliminated in advance.

DETAILED DESCRIPTION OF THE PREFERRED EMBODIMENT

An object of the present invention is to effectively clean a heat exchanger without generating a hazardous substance such as NOx. An object to provide a cleaning device for the heat exchanger which can safely and effectively clean the heat exchanger is realized by electrolysis means for treating dew condensation water of the heat exchanger by an electrochemical technique, supply means for supplying electrolytic water produced by the treatment performed by this electrolysis means to an outer surface of the heat exchanger, and control means for controlling the electrolysis means and the supply means. An embodiment of the present invention will hereinafter be described in detail with reference to the drawings.

Figure 1:
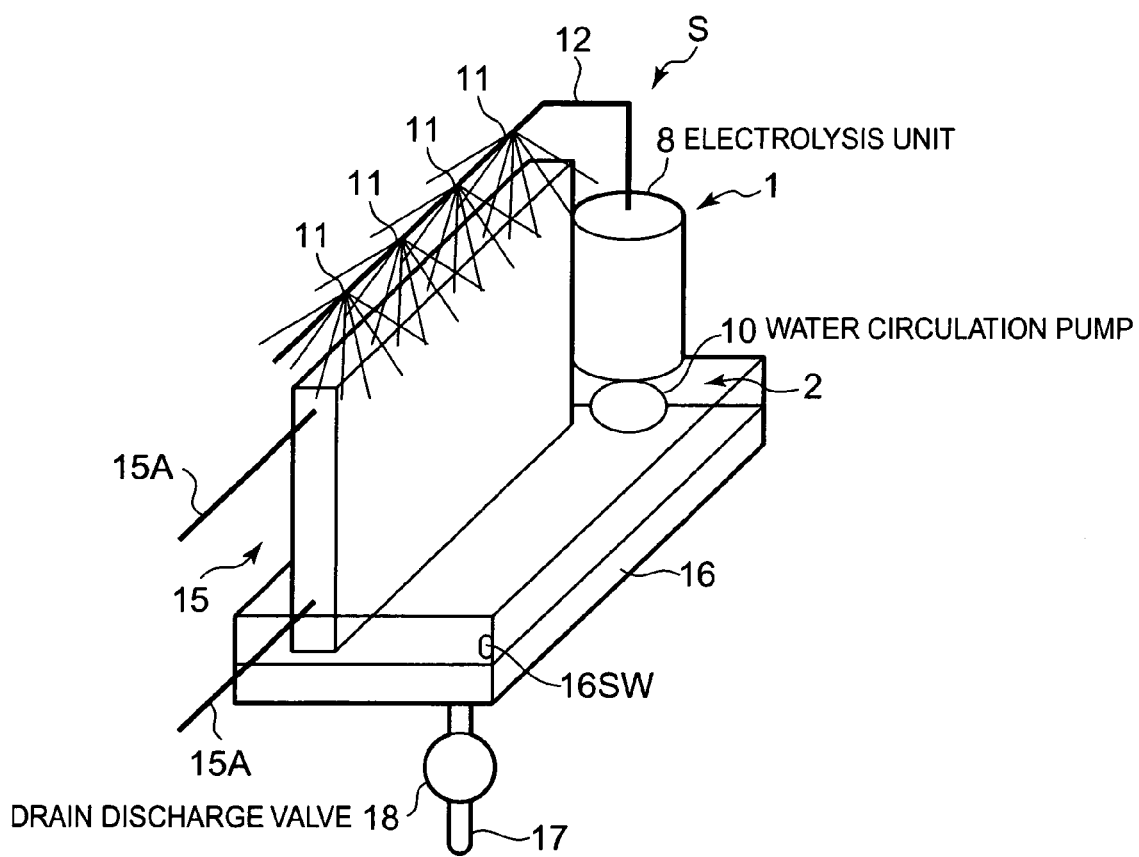
FIG. 1 is a diagram showing a schematic constitution of a cleaning device for a heat exchanger according to one embodiment of the present invention.

FIG. 1 is a schematic constitution diagram of a cleaning device S for a heat exchanger according to one embodiment of the present invention. The cleaning device S is a device for cleaning a heat exchanger 15 and removing germs from (cleaning) the heat exchanger. The cleaning device S for the heat exchanger according to the present invention cleans the heat exchanger 15 which is mounted on a car and which functions as an evaporator of a car air conditioner, and is installed in an engine room of the car. The heat exchanger 15 constitutes a refrigerant cycle of the car air conditioner together with a compressor, a radiator and pressure reduction means (not shown), and is constituted of, for example, fins and pipes 15A arranged along the fins in a heat exchange manner. The heat exchanger 15 is constituted of a material having an excellent corrosion resistance. Usually, it is general that the heat exchanger is made of an alloy of copper and aluminum, but the heat exchanger 15 is desirable to be constituted of a single metal material. When the heat exchanger is constituted of alloy, the surface thereof is coated with a corrosion resistant paint to improve the corrosion resistance. The heat exchanger 15 of the present embodiment is constituted of a material of aluminum.

A drain pan 16 is installed under this heat exchanger 15 so as to receive water in the air which condenses (dew-condenses) in the heat exchanger 15, attaches to the surface (the outer surface) of the heat exchanger in the form of water droplets, gradually grows and drops down owing to a gravity. A bottom portion of the drain pan 16 is connected to a pipe 17, and one end of the pipe 17 opens in the drain pan 16. The pipe 17 extends downward from the one end thereof which opens in the drain pan 16, and the other end thereof opens from the car. Furthermore, a drain discharge valve 18 is interposed in a middle portion of the pipe 17. This drain discharge valve 18 is controlled to open and close by control means 3 described later, and it is constituted that when the control means 3 opens the drain discharge valve 18, the pipe 17 is opened, and dew condensation water in the drain pan 16 (water from the outer surface of the heat exchanger 15) is discharged from the car via the pipe 17. It is also constituted that when the control means 3 closes the drain discharge valve 18, the pipe 17 is blocked, hence the discharge of the dew condensation water in the drain pan 16 stops, and the dew condensation water is received in the drain pan 16. The drain pan 16 is provided with a float switch 16SW for detecting a water level of the dew condensation water received in the drain pan 16.

Moreover, an air blower (not shown) is provided in the vicinity of the heat exchanger 15 so as to suck air from a space to be cooled (the inside of the car in the present embodiment), pass the air through the heat exchanger 15 and discharge the air to the space to be cooled (the inside of the car).

On the other hand, the cleaning device S of the present invention includes electrolysis means 1 and supply means 2 of the heat exchanger 15, and the control means 3 for controlling these means (the electrolysis means 1 and the supply means 2).

Figure 2:
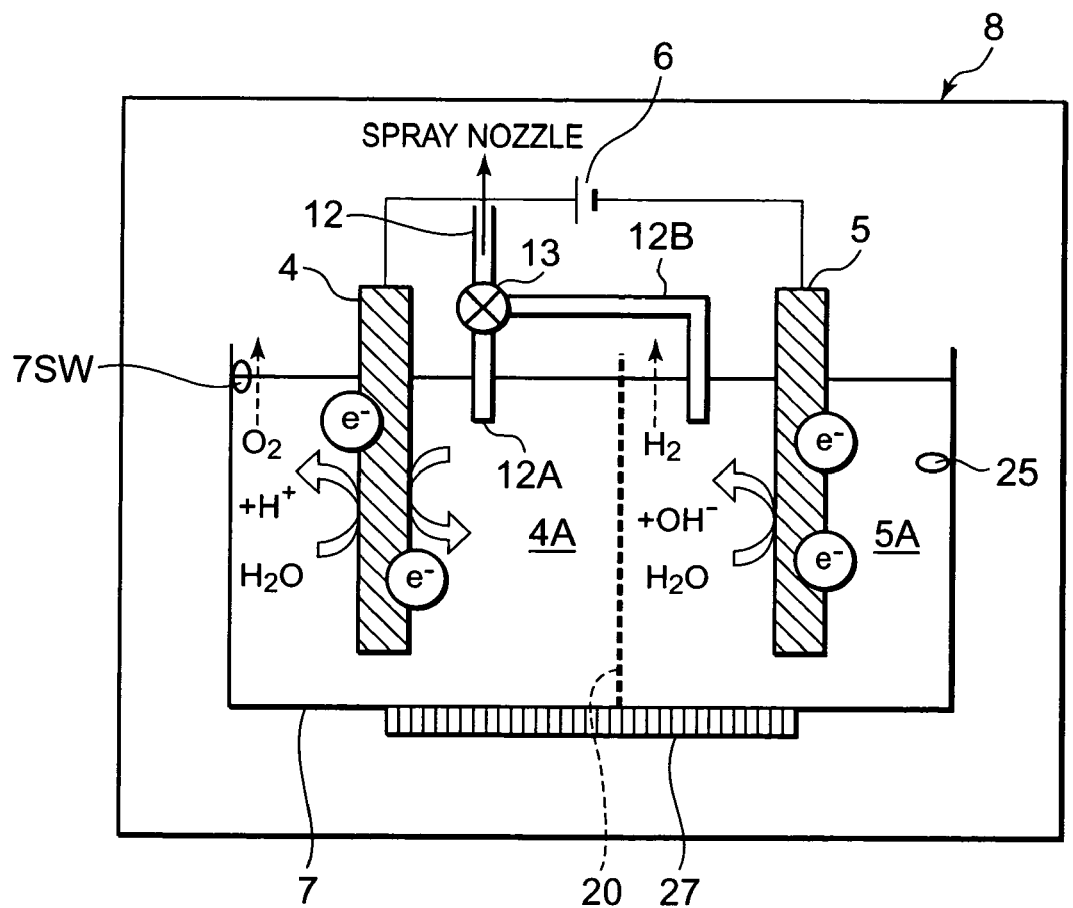
FIG. 2 is a diagram showing electrolysis means of FIG. 1.

The electrolysis means 1 treats the dew condensation water from the heat exchanger 15 by an electrochemical technique. The electrolysis means 1 of the present embodiment is arranged on a leeward side of the heat exchanger 15. As shown in FIG. 2, a pair of electrodes 4, 5, a power source 6 for supplying a power to the electrodes 4, 5 and the like constitute an electrolysis unit 8. The electrodes 4, 5 are provided at such positions as to be immersed into dew condensation water in a water tank 7, when the dew condensation water is stored to a predetermined water level in this water tank 7.

The electrodes 4, 5 are constituted of such a material that active oxygen species can be generated in the electrode 4 on an anode side when energized. The active oxygen species include oxygen molecules having oxidation activity higher than that of usual oxygen, and concerned substances. In the active oxygen species, so-called active oxygen in a narrow sense, for example, super oxide anions, singlet oxygen, hydroxyl radicals or hydrogen peroxide includes so-called active oxygen in a broad sense, for example, ozone or hypohalogen acid. In the present embodiment, the electrodes are constituted of a material capable of producing the ozone in the electrode 4 on the anode side when energized. For example, the material is an electrode plate including a substrate of titanium (Ti) and a catalyst layer of platinum (Pt), tantalum (Ta), an alloy of Pt and Ta or the like.

Moreover, as described above, it is constituted that the dew condensation water received on the drain pan 16 can be supplied into the water tank 7. Specifically, it is constituted that the dew condensation water in the drain pan 16 is pumped up by a water circulation pump 10 of the supply means 2 described later, and supplied into the water tank 7. The water tank 7 is provided with a float switch 7SW for detecting a water level of the dew condensation water to be supplied from the drain pan 16 into the water tank 7.

An ion exchange film 20 is provided in the water tank 7. This ion exchange film 20 is a cation exchange film capable of passing only cations, and the dew condensation water in the water tank 7 is divided by the ion exchange film 20 into an anode chamber 4A side where the anode-side electrode 4 is positioned and a cathode chamber 5A side where the cathode-side electrode 5 is positioned.

On the other hand, the supply means 2 is constituted of the water circulation pump 10, spray nozzles 11, a pipe 12 which connects the pump to these nozzles and the like. The water circulation pump 10 pumps up the dew condensation water received in the drain pan 16 to supply the water to the water tank 7 of the electrolysis means 1, and further pumps up the electrolytic water produced by electrolytically treating the dew condensation water in the water tank 7 to send the water to the spray nozzles 11. The spray nozzles 11 spray, to the heat exchanger 15, the electrolytic water pumped up by the water circulation pump 10. The spray nozzles 11 of the present embodiment are positioned above an upper surface of the heat exchanger 15, and constituted so as to spray the water to the whole outer surface of the heat exchanger 15. That is, it is constituted that the water circulation pump 10 pumps up the dew condensation water in the drain pan 16, and sends the water to the spray nozzles 11 through the water tank 7 to spray the dew condensation water (the electrolytic water) from the spray nozzles 11 to the heat exchanger 15. The water circulation pump 10 is connected to the control means 3, and an operation thereof is controlled.

In addition, the inside of the water tank 7 of the electrolysis means 1 according to the present embodiment is divided into the anode chamber 4A side and the cathode chamber 5A side by the ion exchange film 20 as described above. Therefore, it is constituted that the dew condensation water (the electrolytic water) is pumped from both the chambers 4A, 5A and that the electrolytic water on the anode chamber 4A side and the electrolytic water on the cathode chamber 5A side can be switched and supplied to the heat exchanger 15.

Specifically, as shown in FIG. 2, one end of the pipe 12 having the other end connected to the spray nozzles 11 is branched into two pipes 12A and 12B, one pipe 12A opens in the electrolytic water on the anode chamber 4A side of the water tank 7, and the other pipe 12B opens in the electrolytic water on the cathode chamber 5A side of the water tank 7. A branch point of the pipe 12 is provided with a switch valve (a three-way valve) 13 as channel switch means, and the valve is connected to the control means 3. That is, the switch valve 13 is switched by the control means 3, and controlled so as to supply, to the heat exchanger 15, the electrolytic water on the anode chamber 4A side of the water tank 7 or supply, to the heat exchanger 15, the electrolytic water on the cathode chamber 5A side.

Moreover, in the water tank 7 of the electrolysis means 1, there are provided a temperature sensor 25 for detecting a temperature of the dew condensation water (the dew condensation water is electrolytically treated to obtain the electrolytic water) stored in the water tank 7, and the float switch 7SW for detecting a water level of the dew condensation water stored in the water tank 7. The sensor and the switch are connected to the control means 3. Furthermore, the electrolysis means 1 of the present embodiment includes a heater 27 for heating the dew condensation water stored in the water tank 7, and energization of this heater 27 is also controlled by the control means 3.

Figure 3:
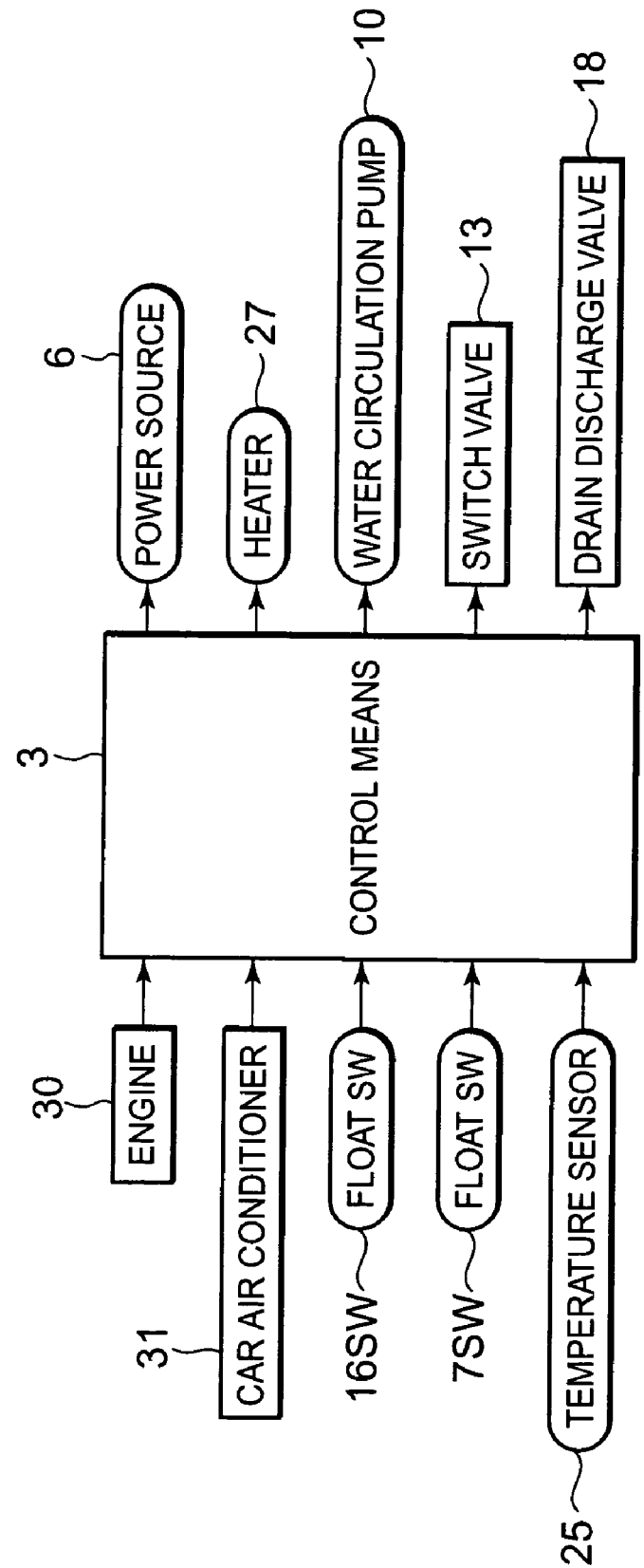
FIG. 3 is a functional block diagram of control means of the cleaning device for the heat exchanger according to the embodiment of the present invention.

The above-mentioned control means 3 performs control of the cleaning device S, and is constituted of a general-purpose microcomputer. As shown in FIG. 3, an input side of the control means 3 is connected to an engine 30 of a car, a car air conditioner 31, the float switch 16SW of the drain pan 16, the float switch 7SW of the water tank 7 of the electrolysis unit 8, the temperature sensor 25 and the like. An output side of the control means is connected to the power source 6 of the electrolysis means 1, the heater 27, the water circulation pump 10 of the supply means 2, the switch valve 13, the drain discharge valve 18 and the like.

It is to be noted that the cleaning device S of the present embodiment has a cleaning and germ removal mode in which the outer surface of the heat exchanger 15 is cleaned and an air cleaning mode in which germs are removed from air passed through the heat exchanger 15. Specifically, the control means 3 varies an amount of the electrolytic water to be supplied to the heat exchanger 15 by the supply means 2 to execute two different operation modes.

That is, in the air cleaning mode, the operation of the water circulation pump 10 of the supply means 2 is controlled so as to set the amount of the electrolytic water to be supplied to the heat exchanger 15 to be smaller than that in the cleaning and germ removal mode. Then, in the cleaning device S of the present embodiment, the control means 3 executes the cleaning and germ removal mode for a certain period immediately after start of electrolysis and then periodically executes the mode, and the control means periodically executes the air cleaning mode at a time when the air conditioner is operated and the cleaning and germ removal mode is not performed. The cleaning and germ removal mode can be executed not only during the operation of the air conditioner but also during stop of the air conditioner.

Figure 4:
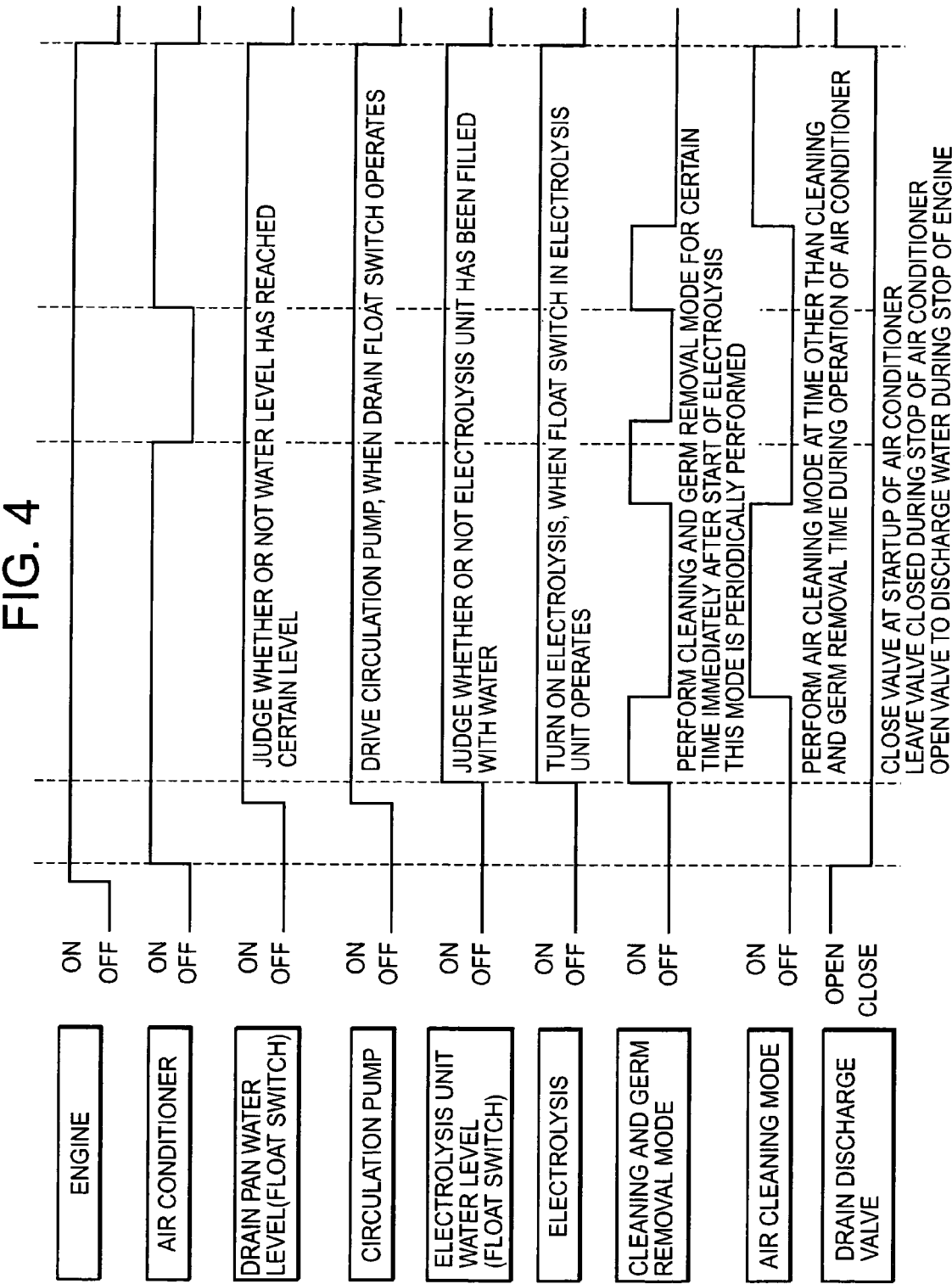
FIG. 4 is a diagram showing a timing chart of the cleaning device for the heat exchanger according to the embodiment of the present invention.

Next, an operation of the cleaning device S for the heat exchanger according to the present embodiment having the above constitution will be described with reference to a timing chart shown in FIG. 4. It is to be noted that the drain discharge valve 18 is opened by the control means 3 during the stop of the engine, so that during the stop of the engine, any dew condensation water is not received on the drain pan 16. First, when the engine of the car is started (ON) and then a switch of the air conditioner is turned on (ON), operations of the compressor (not shown) and the air blower (not shown) of the heat exchanger 15 are started. In consequence, a refrigerant compressed by the compressor releases heat in the radiator, a pressure of the refrigerant is reduced by pressure reduction means, and the refrigerant expands, then flows into the heat exchanger 15, absorbs heat from air in the car (a space to be cooled) blown by the air blower, consequently evaporates in the heat exchanger 15, is then sucked into the compressor and compressed. This cycle is repeated. Moreover, water in the air condenses owing to heat exchange between the water and the refrigerant in the heat exchanger 15, and attaches to the outer surface of the heat exchanger 15. The attached water gradually grows, and drops down onto the drain pan 16 owing to a gravity.

Moreover, when the air conditioner is turned on, the control means 3 closes the drain discharge valve 18 (corresponding to a drain discharge valve of FIG. 4) to block the pipe 17. In consequence, the water from the heat exchanger onto the drain pan 16 is accumulated as the dew condensation water in the drain pan 16 without being discharged. Then, when a water level of the dew condensation water in the drain pan 16 reaches a predetermined level set beforehand, the float switch 16SW operates (ON). When the float switch 16SW operates (ON), the control means 3 starts the water circulation pump 10 (corresponding to the circulation pump of FIG. 4) (ON). At this time, the control means 3 controls the operation of the water circulation pump 10 so that an amount of the electrolytic water to be supplied from the water tank 7 of the electrolysis means 1 to the heat exchanger 15 is comparatively large, to execute the cleaning and germ removal mode. Furthermore, the control means 3 switches the switch valve 13 of the pipe 12 so that the electrolytic water on the cathode chamber 5A side of the water tank 7 is pumped up and sent to the spray nozzles 11. In consequence, the dew condensation water received in the drain pan 16 is sucked from a pipe (not shown) which opens in the dew condensation water of the drain pan 16, and supplied into the water tank 7.

Then, when a predetermined amount of the dew condensation water is stored in the water tank 7, the float switch 7SW of the water tank 7 operates (ON). When the float switch 7SW operates, the control means 3 turns on the power source 6 of the electrolysis means 1 (electrolysis ON), and starts energizing the electrodes 4, 5. At this time, a current value with a current density of 20 milliamperes (mA)/square centimeter (cm²) is applied to the electrodes 4, 5.

When the dew condensation water in the water tank 7 is energized by the electrodes 4, 5, the following reaction occurs in the electrode 4 as an anode:

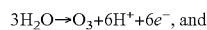

$3H_2O \rightarrow O_3 + 6H^+ + 6e^-$, and the following reaction occurs in the electrode 5 as a cathode:

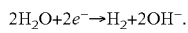

$2H_2O + 2e^- \rightarrow H_2 + 2OH^-$.

Here, a hydroxide ion (OH⁻) produced by the electrode 5 is a very strong base. This hydroxide ion cannot move toward the anode chamber 4A provided with electrode 4 owing to the presence of the ion exchange film 20, and hence remains on the cathode chamber 5A side. In consequence, the cathode chamber 5A side is alkalified. Moreover, a hydrogen ion (H⁺) is produced in the electrode 4, and hence the anode chamber 4A side is acidified.

The electrolytic water produced in the water tank 7 is sent to the spray nozzles 11 by the water circulation pump 10. At this time, as described above, the control means 3 switches the switch valve 13 of the pipe 12 so that the electrolytic water on the cathode chamber 5A side of the water tank 7 is sent to the spray nozzles 11, and hence the alkaline electrolytic water (hereinafter referred to as the alkaline water) on the cathode chamber 5A side is sprayed from the spray nozzles 11 to the heat exchanger 15. Owing to the supply of this alkaline water, dirt such as dust, especially oil dirt attached to the outer surface of the heat exchanger 15 is dissolved. Therefore, dirt such as the dust attached to the outer surface of the heat exchanger 15 can be removed (cleaned).

Then, the alkaline water supplied to the outer surface of the heat exchanger 15 to remove the dirt from the outer surface of the heat exchanger 15 flows downward, enters the drain pan 16, is accumulated in the drain pan 16 in the form of the dew condensation water, and is pumped up by the water circulation pump 10 again. This cycle is repeated.

When a predetermined time set beforehand elapses after start of the supply of the alkaline water, the control means 3 switches the switch valve 13 of the pipe 12 so that the electrolytic water on the anode chamber 4A side of the water tank 7 is sent to the spray nozzles 11. In consequence, ozone-including electrolytic water (hereinafter referred to as the ozone water) on the anode chamber 4A side of the water tank 7 is sent to the spray nozzles 11, and sprayed from the spray nozzles 11 to the heat exchanger 15. This supplied ozone water removes mold, germs and the like attached to the outer surface of the heat exchanger 15. That is, the ozone water is supplied to the outer surface of the heat exchanger 15, whereby the mold, bacteria, microorganism and the like attached to the outer surface of the heat exchanger 15 can be destroyed, or the outer surface can be sterilized.

In consequence, the mold, bacteria and microorganism which are causes for bad odor of the heat exchanger 15 can be removed. Therefore, generation of the bad odor of the heat exchanger 15 can be prevented, and a disadvantage that the space to be cooled (the inside of the car in the present embodiment) is contaminated can securely be eliminated.

Moreover, in a case where it is assumed that the electrolysis means 1 is disposed so as to electrolytically treat the dew condensation water of the heat exchanger 15 as in the present invention, the water for the electrolysis does not have to be separately supplied. Therefore, a water supply work for supplying the water for the electrolysis does not have to be performed, and hence costs can be reduced.

Furthermore, in a conventional cleaning device for the heat exchanger, gas-phase ozone is produced from air, and bubbled in water in the form of fine bubbles to produce the ozone water, so that a concentration of the ozone water cannot be set to be high, and a sufficient sterilization effect cannot be obtained.

However, the dew condensation water of the heat exchanger 15 is directly electrolytically treated as in the present invention, whereby the ozone concentration of the electrolytic water can be set to be sufficiently high, and hence the sterilization effect can be improved. Furthermore, the electrolysis means 1 of the present embodiment is arranged on the leeward side of the heat exchanger 15. Therefore, air cooled by heat exchange performed between the air and the refrigerant in the heat exchanger 15 is blown to the electrolysis means 1, so that a temperature of the electrolysis means 1 (the dew condensation water in the water tank 7) can be lowered. In this case, it is known that an amount of the ozone to be generated by the electrolytic treatment depends on a water temperature.

Figure 5:
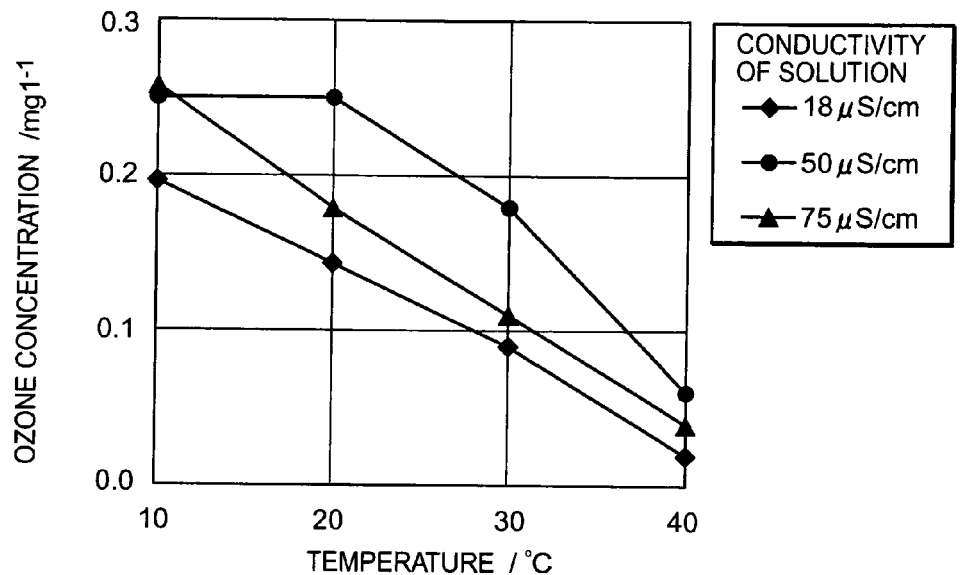
FIG. 5 is a diagram showing a relation between a concentration of ozone water and a water temperature.

FIG. 5 is a diagram showing a relation between an ozone concentration of the electrolytic water (the ozone water) produced by the electrolysis and a water temperature. FIG. 5 shows a relation between the water temperature and the ozone concentration of the electrolytic water (a solution) produced by the electrolytic treatment performed in a case where the electrolytic water (corresponding to a solution of FIG. 5) has a conductivity of 18 µS/cm as shown by black squares, the electrolytic water (the solution of FIG. 5) has a conductivity of 50 µS/cm as shown by black circles, and the ozone water (the solution) has a conductivity of 75 µS/cm as shown by black triangles. It is seen from FIG. 5 that the lower the water temperature of each electrolytic water is, the higher the ozone concentration becomes and that the higher the water temperature is, the lower the ozone concentration of the electrolytic water becomes. That is, it is clear that when the water temperature lowers, the amount of the ozone generated by the electrolysis increases and that when the water temperature rises, the amount of the ozone to be generated lowers.

According to the above results, the electrolysis means 1 is arranged on the leeward side of the heat exchanger 15, and hence the temperature of the electrolysis means 1 can be lowered by the heat exchanger 15, whereby the amount of the ozone to be generated in the electrolysis means 1 can be increased. In consequence, the ozone concentration of the electrolytic water can further be raised, and the sterilization effect of the heat exchanger 15 can further be improved.

In addition, as described above, the electrolysis means 1 is arranged on the leeward side of the heat exchanger 15, and the temperature of the electrolysis means 1 is lowered, whereby the amount of the ozone to be generated in the electrolysis means 1 can be increased. However, when the temperature of the electrolysis means 1 excessively lowers, a danger that the ozone is excessively produced occurs, depending on an operating situation of the heat exchanger 15 or the like. In the cathode-side electrode 5, when the temperature of the electrolytic water rises, the amount of the hydroxide ions to be produced increases, and hence the concentration becomes high. When the temperature lowers, the concentration lowers. To solve the problem, the control means 3 controls the energization of the heater 27 provided in the vicinity of the electrolysis means 1 in accordance with the temperature of the dew condensation water in the water tank 7 detected by the temperature sensor 25 so that the dew condensation water in the water tank 7 has an optimum temperature.

Specifically, the control means 3 starts energizing the heater 27, when the temperature of the dew condensation water in the water tank 7 detected by the temperature sensor 25 lowers to a predetermined lower limit value. In consequence, the dew condensation water in the water tank 7 is heated by the heater 27. Then, the control means 3 stops energizing the heater 27, when the temperature of the dew condensation water in the water tank 7 detected by the temperature sensor 25 rises to a predetermined upper limit value. The temperature of the dew condensation water in the water tank 7 is controlled in this manner, whereby the amount of the ozone to be generated in the electrode 4 on the anode chamber 4A side of the electrolysis means 1 does not excessively increase or decrease, and can be optimized. In consequence, the above-mentioned danger due to the excessive generation of the ozone or deterioration of a sterilization capability due to the excessively small amount of the ozone to be generated can be eliminated. Furthermore, the temperature of the dew condensation water in the water tank 7 is controlled, whereby it is possible to eliminate disadvantages that the concentration of the alkaline water on the cathode chamber 5A side excessively lowers and that such a cleaning effect of the heat exchanger 15 cannot be obtained.

Furthermore, in the cleaning device S of the present embodiment, as described above, the alkaline water is supplied to the outer surface of the heat exchanger 15, and then the ozone water is supplied, so that cleaning of the oil dirt or the like and removal of the germs (sterilization) can be performed. Moreover, the alkaline water is supplied to the outer surface of the heat exchanger 15, and the ozone water is supplied after elapse of a predetermined time, whereby the hydroxide ions in the alkaline water supplied to the outer surface of the heat exchanger 15 are oxidized to produce hydrogen peroxide ($H_2O_2$). Then, when the ozone water is supplied, hydrogen peroxide reacts with the ozone to produce OH radicals.

These OH radicals have an excellent sterilization capability. Therefore, the OH radicals are produced on the outer surface of the heat exchanger 15, whereby the sterilization effect of the outer surface of the heat exchanger 15 can further be improved.

In addition, when the above-mentioned cleaning and germ removal mode is executed for a certain time after the start of the electrolysis, the control means 3 stops (OFF) the cleaning and germ removal mode. Then, the control means 3 subsequently executes the air cleaning mode. In the air cleaning mode, the control means 3 controls the operation of the water circulation pump 10 so as to set the amount of the electrolytic water to be supplied to the heat exchanger 15 to be smaller than that in the cleaning and germ removal mode. The control means 3 switches the switch valve 13 of the pipe 12 so as to send the electrolytic water on the anode chamber 4A of the water tank 7 to the spray nozzles 11. In consequence, the ozone water on the anode chamber 4A side of the water tank 7 is supplied to the spray nozzles 11, and sprayed from the spray nozzles 11 to the heat exchanger 15.

Here, the air passed through the heat exchanger 15 comes in contact with the sprayed ozone water, and is then discharged into the car. The ozone in the ozone water destroys and eliminates (removes) the germs in a case where the germs invade the air of the car. For example, the ozone has a function of destroying and eliminating (removing) surface proteins (spikes) of influenza viruses essential for infection of influenza, in a case where the viruses invade the air of the car. When these viruses are destroyed, the influenza viruses cannot combine with a receptor necessary for the infection of the viruses, whereby the infection is inhibited.

In consequence, germs such as the bacteria and viruses can be removed from the air passed through the heat exchanger 15 to purify the air. As described above, in the air cleaning mode, the amount of the electrolytic water to be supplied to the heat exchanger 15 is set to be smaller than that in the cleaning and germ removal mode, whereby the humidification of the air with the electrolytic water can be inhibited. Especially, in a case where the cleaning device S is mounted on the car for use in cleaning the heat exchanger which functions as the evaporator of the car air conditioner as in the present embodiment, when the air of the car is humidified with the electrolytic water, glass of the car is fogged, and the operation might be disturbed, but the amount of the electrolytic water to be supplied to the outer surface of the heat exchanger 15 is reduced to inhibit such humidification of the air, whereby generation of the fog on the glass can be prevented, or the generation of the fog can be suppressed.

Then, when the control means 3 performs the above air cleaning mode for a predetermined time, the mode is stopped (OFF), and the cleaning and germ removal mode is executed again. In the present embodiment, the control means 3 periodically executes the air cleaning mode during the operation of the air conditioner as shown in FIG. 4.

On the other hand, when the engine is stopped, the control means 3 stops (OFF) the operations of the power source 6 of the electrolysis means 1 and the water circulation pump 10, and the control means 3 opens the drain discharge valve 18. In consequence, the dew condensation water in the drain pan 16 is discharged from the car via the pipe 17, and the float switch 16SW of the drain pan 16 and the float switch 7SW of the water tank 7 of the electrolysis means 1 are turned off (OFF). It is to be noted that the drain discharge valve 18 remains to be opened until the engine starts up and the power source of the air conditioner is turned on next time.

Figure 6:
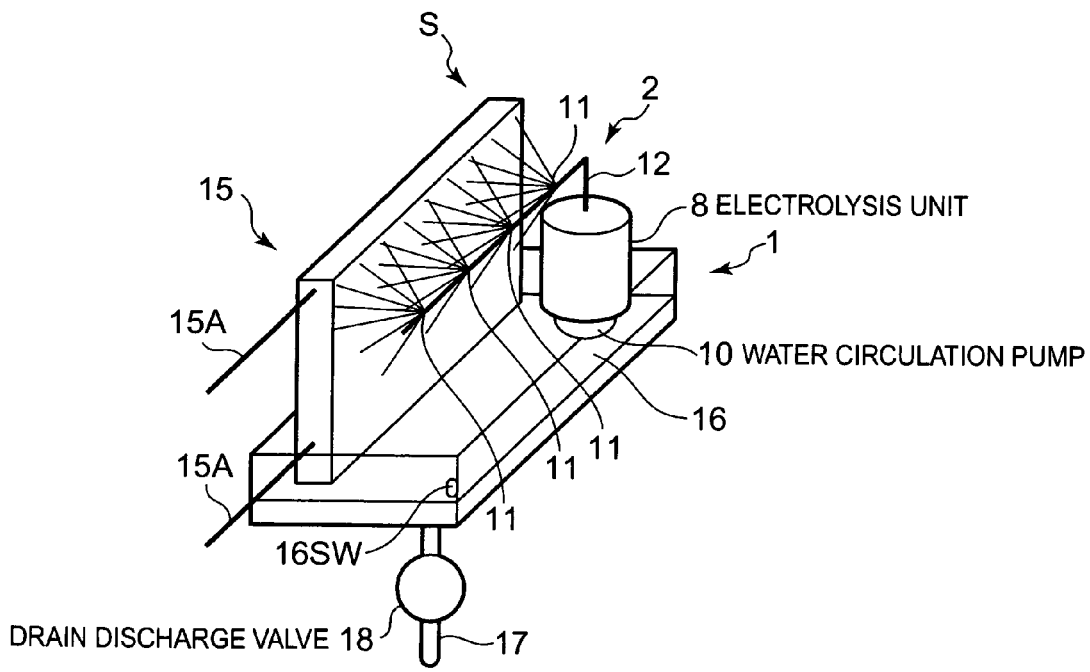
FIG. 6 is a diagram showing a schematic constitution of a cleaning device for a heat exchanger according to another embodiment of the present invention.

It is to be noted that in the present embodiment, the electrolytic water electrolyzed by the electrolysis means 1 is sprayed from an upper part of the heat exchanger 15 to the heat exchanger 15, but the present invention is not limited to this embodiment, and the water may be sprayed to a side surface of the heat exchanger 15 as shown in FIG. 6. Furthermore, in the above embodiment, the dew condensation water received in the drain pan 16 is supplied into the water tank 7 by the water circulation pump 10 to perform the electrolysis in the water tank 7. However, it is effective that the water tank 7 is not disposed, the electrodes 4, 5 are immersed into the dew condensation water received in the drain pan 16 to directly electrolyze the dew condensation water in the drain pan 16, and this water is pumped up with the water circulation pump 10 and sprayed from the spray nozzles 11 to the heat exchanger 15.

Moreover, in the present embodiment, the ion exchange film 20 is installed in the water tank 7 of the electrolysis means 1 to divide the dew condensation water in the water tank 7 into the anode chamber 4A side where the anode-side electrode 4 is positioned and the cathode chamber 5A side where the cathode-side electrode 5 is positioned, but the present invention is effective even in a case where the electrolysis means 1 is constituted without providing the ion exchange film 20. In this case, the ion exchange film 20 is not disposed, and hence any alkaline electrolytic water cannot be supplied to the heat exchanger 15, but the active oxygen species (the ozone in the embodiment) are generated in the anode-side electrode, so that the electrolytic water including the active oxygen species can be produced. Needless to say, the electrolytic water is supplied to the outer surface of the heat exchanger 15 to obtain a cleaning effect of the heat exchanger 15.

Furthermore, in the above embodiment, the cleaning device S for the heat exchanger is mounted on the car so as to clean the heat exchanger 15 which functions as the evaporator of the car air conditioner, but the cleaning device of the present invention is not limited to this embodiment. For example, the present invention may be applied to an air conditioner which conditions air in a room so as to clean a heat exchanger which functions as an evaporator of the air conditioner.

What is claimed is:

1. A cleaning device for a heat exchanger, the cleaning device comprising:
   electrolysis means for treating dew condensation water condensed at the heat exchanger by an electrochemical technique;
   supply means for supplying electrolytic water including anode side water and cathode side water produced by the treatment performed by the electrolysis means, to an outer surface of the heat exchanger; and
   control means for controlling the electrolysis means and the supply means and for switching between an cleaning and germ removal mode and an air cleaning mode,
   wherein the control means controls the supply means to supply the cathode side water and then supply the anode side water in the cleaning and germ removal mode to clean the outer surface of the heat exchanger, and to supply the anode side water in an air cleaning mode to remove germs from the air passed through the heat exchanger.

2. The cleaning device for the heat exchanger according to claim 1, wherein the electrolysis means includes an anode and a cathode to be immersed into the dew condensation water, and an ion exchange film which divides the dew condensation water into an anode side and a cathode side.

3. The cleaning device for the heat exchanger according to claim 2, wherein an amount of the electrolytic water to be supplied to the heat exchanger by the supply means in the air cleaning mode is set to be smaller than that in the cleaning and germ removal mode.

4. The cleaning device for the heat exchanger according to claim 2, wherein the electrolysis means is arranged on a leeward side of the heat exchanger.

5. The cleaning device for the heat exchanger according to claim 2, wherein the control means controls the electrolysis means in accordance with a temperature of the dew condensation water.

6. The cleaning device for the heat exchanger according to claim 1, wherein an amount of the electrolytic water to be supplied to the heat exchanger by the supply means in the air cleaning mode is set to be smaller than that in the cleaning and germ removal mode.

7. The cleaning device for the heat exchanger according to claim 6, wherein the electrolysis means is arranged on a leeward side of the heat exchanger.

8. The cleaning device for the heat exchanger according to claim 6, wherein the control means controls the electrolysis means in accordance with a temperature of the dew condensation water.

9. The cleaning device for the heat exchanger according to claim 1, wherein the control means controls the electrolysis means in accordance with a temperature of the dew condensation water.

10. The cleaning device for the heat exchanger according to claim 1, wherein the electrolysis means is arranged on a leeward side of the heat exchanger.

11. The cleaning device for the heat exchanger according to claim 1, wherein the air cleaning mode is performed after elapse of a predetermined time after performing of the cleaning and germ removal mode.

* * * * *